No. 762,765. Patented June 14, 1904.

UNITED STATES PATENT OFFICE.

RICHARD SCHMIDT, OF HOLZMINDEN, GERMANY, ASSIGNOR, BY MESNE ASSIGNMENTS, TO HAARMANN & REIMER, CHEMISCHE FABRIK ZU HOLZMINDEN, G. M. B. H., OF HOLZMINDEN, GERMANY, A FIRM.

HOMOLOGUES OF ISOIONONE AND PROCESS OF MAKING SAME.

SPECIFICATION forming part of Letters Patent No. 762,765, dated June 14, 1904.

Application filed August 23, 1901. Serial No. 73,026. (Specimens.)

*To all whom it may concern:*

Be it known that I, RICHARD SCHMIDT, a subject of the Duke of Brunswick, doctor of philosophy, chemist, and a resident of Holzminden, in the Duchy of Brunswick, German Empire, have invented certain new and useful Homologues of Isoionone and Process of Making the Same, of which the following is a specification.

In Haarmann & Reimer's German Patent No. 116,637 it has been shown that ionone may be obtained by condensing cyclo-citral and acetone by means of alkaline agents.

I have found that the alpha and beta homologues of ionone may be prepared directly by condensing the homologues of acetone with the different cyclo-citrals. Thus I may use, for instance, the crude cyclo-citral described in Strebel's German Patent No. 108,335 or obtained by any modification of the process therein described. The product derived from this cyclo-citral is a mixture of alpha and beta homoionones, which may be separated by means of their semicarbazones. The beta cyclo-citral, which exists in large proportion in crude cyclo-citral and may be isolated by means of its semicarbazone, may also be used. In this case beta-homoionones are obtained. Finally, to prepare alpha-homoionones one may start with the alpha cyclo-citral isolated from crude cyclo-citral by means of a suitable hydrogenizing agent, like sodium amalgam and acetic acid, which transforms the beta cyclo-citral into a substance of very high boiling-point and melting at 129° centigrade, but leaves the alpha cyclo-citral unchanged, which is separated by distillation with steam. Alpha cyclo-citral has been found to possess a boiling-point of from 90° to 95° centigrade (mercury column in vapor) and a specific gravity of 0.925 to 0.930. Its semicarbazone melts at 204° to 206°

The present invention relates to the manufacture of homologues of alpha and beta ionone in the manner indicated above and is illustrated by the following example:

Example: Fifty parts of crude or pure cyclo-citral are mixed with one hundred parts of methylethyl-ketone, and to this mixture five parts of sodium dissolved in the requisite quantity of alcohol are added. The mixture is left at the ordinary temperature for an hour or two or more, if necessary, until the odor of cyclo-citral has disappeared. The mixture is then acidified slightly with a solution of some weak acid, such as tartaric acid, and is distilled in steam, which carries over first all excess of the methylethyl-ketone and finally the methylionone.

When a mixture of alpha and beta cyclo-citral is used, a mixture of alpha and beta methylionone is obtained. These are separated by means of their semicarbazones, and the homoionones are then produced by the action of dilute acids in the known manner. By using pure alpha cyclo-citral there is obtained alpha-methylionone, while by using pure beta cyclo-citral I obtain beta-methylionone. These homoionones have the following characteristics:

Alpha-methylionone boils at 140° to 155° centigrade under twenty millimeters pressure (not corrected) and has a specific gravity of 0.925 to 0.931 at 20° centigrade, the refracting-index being $n_D = 1.50$–$1.51$.

Beta-methylionone boils at 140° to 150° centigrade under twenty millimeters pressure (not corrected) and has a specific gravity of 0.935 to 0.940 at 20° centigrade, the refracting-index being $n_D = 1.50$–$1.52$. The distinguishing characteristics of the dimethyl substitution products of ionone obtained by my process are the following: alpha-dimethylionone, boiling-point 145° to 160° under twenty millimeters pressure, specific gravity 0.915 to 0.924 at 20°, refracting-index $n_D = 1.49$–$1.50$; beta-dimethylionone, (dimethylisoionone,) boiling-point 155° to 160° under twenty millimeters pressure, specific gravity 0.927 to 0.935 at 18°, refracting-index $n_D = 1.51$–$1.52$. In a similar manner the pure alpha cyclo-citral or the pure beta cyclo-citral may be condensed not only with the other ordinary homologues of acetone, but with unsaturated ketones, such as mesityloxid, methyl-heptenones, and the like. The products obtained in this manner from mesityloxid are these: alpha propenyl-ionone, boiling at 155° to 165° centigrade under fifteen millimeters pressure, (not corrected,) specific gravity 0.935 to 0.940 at 20° centigrade, refracting-index about 1.52; and beta propenyl-ionone, boiling at 160° to 172° centigrade at fifteen millimeters pressure, specific gravity 0.940 to 0.945 at 20° centigrade, refracting-index about 1.53.

I am aware that it is old to form a condensation product called "ionone" of the ketone series from cyclo-citral and acetone, and I am also aware of the splitting up of commercial ionone and of its homologues, which latter were heretofore obtained from the aliphatic aldehydes and ketones by condensation with alkali and subsequent conversion with acid into an alpha and a beta series; but as far as I am aware I am the first to devise a method for manufacturing homo cyclic ionones and their alpha and beta isomers directly from ordinary commercial cyclo-citral.

What I claim, and desire to secure by Letters Patent of the United States, is—

1. The process herein described for manufacturing isomers of cyclo homoionones, which consists in treating a mixture of cyclic citral and homologous ketones with condensing agents, and purifying and separating the resultant condensation products.

2. The process herein described for manufacturing isomers of cyclic homoionones which consists in treating a mixture of pure isomers of cyclic citral and homologous ketones with suitable condensing agents, and purifying and separating the resultant condensation products.

3. The herein-described condensation products of homologous ketones and isomers of cyclo-citral, these products being homologues of cyclic beta or iso ionone possessing the odor of violets and orris and having the physical and chemical characteristics herein set forth.

In witness whereof I have hereunto signed my name in the presence of two subscribing witnesses.

RICHARD SCHMIDT.

Witnesses:
WOLDEMAR HAUPT,
HENRY HASPER.